United States Patent [19]

Hattori et al.

[11] Patent Number: 5,017,636

[45] Date of Patent: May 21, 1991

[54] RUBBER COMPOSITIONS FROM MODIFIED TRANS-POLYBUTADIENE AND RUBBER FOR TIRES

[75] Inventors: Iwakazu Hattori, Ama; Noboru Shimada, Yokkaichi; Noboru Oshima, Suzuka; Mitsuhiko Sakakibara, Matsudo; Hiroshi Mouri, Kodaira; Tatsuo Fujimaki; Tatsuro Hamada, both of Tokyo, all of Japan

[73] Assignees: Japan Synthetic Rubber Co., Ltd.; Bridgestone Corporation, both of Tokyo, Japan

[21] Appl. No.: 521,008

[22] Filed: May 10, 1990

Related U.S. Application Data

[63] Continuation of Ser. No. 7,254,637, Oct. 7, 1988, abandoned.

[30] Foreign Application Priority Data

Oct. 9, 1987 [JP] Japan .................. 62-253875
Nov. 21, 1987 [JP] Japan .................. 62-293112
Nov. 21, 1987 [JP] Japan .................. 62-293113

[51] Int. Cl.$^5$ .................. C08K 5/09; C08L 19/00
[52] U.S. Cl. .................. 524/300; 524/526; 525/343
[58] Field of Search .................. 524/284, 300, 526; 525/232, 236, 237, 340, 343, 374, 386

[56] References Cited

U.S. PATENT DOCUMENTS

| | | | |
|---|---|---|---|
| 3,150,209 | 9/1964 | Short | 525/237 |
| 3,335,041 | 8/1967 | Osborne | 525/237 |
| 3,846,385 | 11/1974 | Hargis et al. | |
| 3,903,019 | 9/1975 | Hargis et al. | |
| 3,992,561 | 11/1976 | Hargis et al. | 526/181 |
| 4,020,115 | 4/1977 | Hargis et al. | |
| 4,033,900 | 7/1977 | Hargis et al. | 526/173 |
| 4,048,427 | 9/1977 | Hargis et al. | 526/335 |
| 4,503,204 | 3/1985 | Bingham et al. | 526/187 |
| 4,553,578 | 11/1985 | Vitus et al. | 525/314 |
| 4,616,065 | 10/1986 | Hargis | 525/99 |

FOREIGN PATENT DOCUMENTS

240899 11/1986 Fed. Rep. of Germany .

*Primary Examiner*—Christopher Henderson
*Attorney, Agent, or Firm*—Sughrue, Mion, Zinn, Macpeak & Seas

[57] ABSTRACT

A rubber composition for tire having improved processability, wear resistance, rebound resilience and heat build-up comprises 20~70 parts by weight of a specified butadiene polymer, 30~80 parts by weight of at least one rubber selected from natural rubber, high cis-1,4 polyisoprene rubber and styrene-butadiene copolymer rubber, and 0~30 parts by weight of high cis-1,4 polybutadiene and/or low cis-1,4 polybutadiene, and contains 35~100 parts by weight of carbon black, 0~50 parts by weight of process oil, 0.5~5 parts by weight of aliphatic carboxylic acid and 0.1~3 parts by weight of sulfur based on 100 parts by weight of the above rubber components.

19 Claims, 1 Drawing Sheet

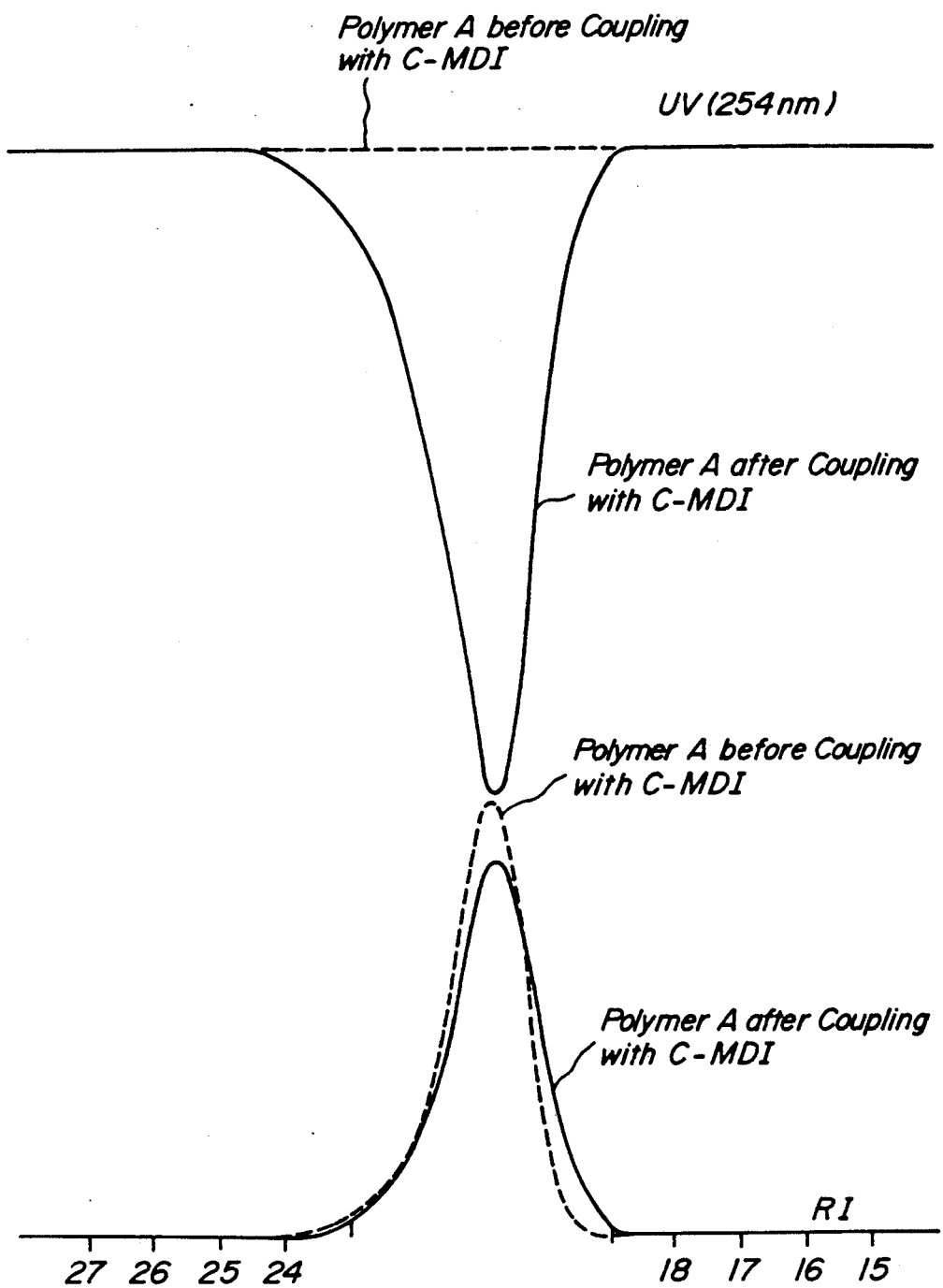
FIG_1

RUBBER COMPOSITIONS FROM MODIFIED TRANS-POLYBUTADIENE AND RUBBER FOR TIRES

This is a continuation of application Ser. No. 07/254,637 filed Oct. 7, 1988 now abandoned.

BACKGROUND OF THE INVENTION

1. Field of the Invention

This invention relates to a rubber composition for tires having improved processability, wear resistance, rebound resilience and heat build-up.

2. Related Art Statement

As a polybutadiene used in the rubber composition for tire, there have hitherto been used high cis1,4 polybutadiene obtained by using a Ziegler catalyst, low cis-1,4 polybutadiene obtained by using a lithium catalyst, and the like. In these polybutadienes, it is difficult to simultaneously establish the processability and the vulcanization properties such as wear resistance, rebound resilience, heat build-up and the like.

Besides the above polybutadienes, polybutadiene obtained by emulsion polymerization process, polybutadiene recently obtained by using an alkaline earth metal catalyst and the like (Japanese Patent laid open No. 60-197,749) are known as a polybutadiene having a high trans-1,4 content. They are excellent in the processability, but are unsatisfactory in the vulcanization properties. Although the processability and the wear resistance are excellent, there is particularly a problem on the rebound resilience and heat build-up as the vulcanization properties.

SUMMARY OF THE INVENTION

It is, therefore, an object of the invention to solve the aforementioned problems of the conventional techniques and to provide a rubber composition for tire having an excellent processability and satisfying improved wear resistance, rebound resilience and heat build-up as a vulcanizate.

According to a first aspect of the invention, there is the provision of a rubber composition for tire comprising 20~70 parts by weight of a butadiene polymer having a trans-1,4 content of 70~90%, a vinyl content of 2~10% and a Mooney viscosity ($ML_{1+4}$, 100° C.) of 30~100 and modified with at least one compound selected from the group consisting of (a) isocyanate compounds and/or isothiocyanate compounds, (b) isocyanuric acid derivatives and/or thiocarbonyl containing compounds thereof, (c) urea compounds, (d) amide compounds and/or imide compounds, (e) N-alkyl substituted oxazolydinone compounds, (f) pyridyl substituted ketone compounds and/or pyridyl substituted vinyl compounds, (g) lactam compounds, (h) diesters of dicarboxylic acids, (i) xanthogen compounds, (j) dithio acid compounds, (k) phosphoryl chloride compounds, (l) silane compounds and/or alkoxysilane compounds and (m) carbonate compounds (hereinafter referred to as modified polymer A), 30~80 parts by weight of at least one rubber selected from natural rubber, high cis-1,4 polyisoprene rubber and styrene-butadiene copolymer rubber having a glass transition temperature of not higher than −50° C., and 0~30 parts by weight of high cis-1,4 polybutadiene and/or low cis-1,4 polybutadiene, and containing 35~100 parts by weight of carbon black, 0~50 parts by weight of process oil, 0.5~5 parts by weight of aliphatic carboxylic acid and 0.1~3 parts by weight of sulfur based on 100 parts by weight of total amount of the above rubber components.

According to a second aspect of the invention, there is the provision of a rubber composition for tire comprising 20~70 parts by weight of a butadiene polymer having a trans-1,4 content of 70~90%, a vinyl content of 2~10% and a Mooney viscosity ($ML_{1+4}$, 100° C.) of 30~100, at least 20% by weight of which being bonded with a tin compound of monofunctionality or difunctionality in a non-branched form (hereinafter referred to as modified polymer B), 30~80 parts by weight of at least one rubber selected from natural rubber, high cis-1,4 polyisoprene rubber and styrene-butadiene copolymer rubber having a glass transition temperature of not higher than −50° C., and 0~30 parts by weight of high cis-1,4 polybutadiene and/or low cis-1,4 polybutadiene, and containing 35~100 parts by weight of carbon black, 0~50 parts by weight of process oil, 0.5~5 parts by weight of aliphatic carboxylic acid and 0.1~3 parts by weight of sulfur based on 100 parts by weight of total amount of the above rubber components.

According to a third aspect of the invention, there is the provision of a rubber composition for tire comprising 20~70 parts by weight of a butadiene polymer having a trans-1,4 content of 70~90%, a vinyl content of 2~10% and a Mooney viscosity ($ML_{1+4}$, 100° C.) Of 30~100 and containing 10~70% by weight of a structure bonded with a tin compound of trifunctionality or tetrafunctionality in a branched form and 90~30% by weight of a non-branched structure (hereinafter referred to as modified polymer C), 30~80 parts by weight of at least one rubber selected from natural rubber, high cis-1,4 polyisoprene rubber and styrene-butadiene copolymer rubber having a glass transition temperature of not higher than −50° C., and 0~30 parts by weight of high cis-1,4 polybutadiene and/or low cis-1,4 polybutadiene, and containing 35~100 parts by weight of carbon black, 0~50 parts by weight of process oil, 0.5~5 parts by weight of aliphatic carboxylic acid and 0.1~3 parts by weight of sulfur based on 100 parts by weight of total amount of the above rubber components.

BRIEF DESCRIPTION OF THE DRAWING

FIG. 1 is a GPC chart of polymer A obtained in Reference Example 1.

DESCRIPTION OF THE PREFERRED EMBODIMENTS

In the production of the modified polymers (A), (B) and (C) used in the invention, there is used a catalyst system consisting essentially of (α) an organomagnesium compound and/or an organic alkali metal compound (hereinafter referred to as α-component), (β) an organic alkaline earth metal compound except for the organomagnesium compound (hereinafter referred to as β-component) and (γ) an organoaluminum compound (hereinafter referred to as γ-component).

As the organomagnesium compound of the α-component, mention may be made of dialkyl magnesium compounds and diallyl magnesium compounds, an example of which includes dimethyl magnesium, dipropyl magnesium, dibutyl magnesium, ethylbutyl magnesium, ethylhexyl magnesium, dihexyl magnesium, dioctyl magnesium, didecyl magnesium, didodecyl magnesium, dicyclohexyl magnesium, dicyclopentyl magnesium, diphenyl magnesium, ditolyl magnesium, ethyl magnesium bromide, ethyl magnesium chloride, allyl magnesium bromide, propyl magnesium bromide, n-butyl magnesium chloride, phenyl magnesium bromide, phenyl magnesium iodide and so on.

As the organic alkali metal compound being the other compound of the α-component, mention may be made of alkyllithiums such as ethyllithium, propyllithium, n-butyllithium, sec-butyllithium, t-butyllithium, hexyllithium, 1,4-dilithiobutane, a reaction product between butyllithium and divinylbenzene and the like; alkylene dilithiums; phenyllithium, stilbene dilithium, isopropenylbenzene dilithium, sodium naphthalene, potassium napthalene, lithium naphthalene and so on.

These organomagnesium compounds and organic alkali metal compounds as the α-component can be used alone or in admixture.

The amount of α-component used is dependent upon the molecular weight and Mooney viscosity of the resulting (co)polymer, but it is usually within a range of 0.05~10 millimol, preferably 0.1~8 millimol per 100 g of monomer.

As the organic alkaline earth metal compounds (except for the above organomagnesium compound), there are organic metal compounds of barium, calcium, and strontium. Concretely, barium compounds may include barium dimethoxide, barium diethoxide, barium diisopropoxide, barium di-n-butoxide, barium di-secbutoxide, barium di-t-butoxide, barium di-(1,1dimethylpropoxide), barium di-(1,2-dimethylpropoxide), barium di-(1,1-dimethylbutoxide), barium di-(1,1-dimethylpentoxide), barium di-(2-ethylhexanoxide), barium di-(1-methylheptoxide), barium diphenoxide, barium di-(p-methylphenoxide), barium di-(p-butylphenoxide), barium di-(o-methylphenoxide), barium di-(p-octylphenoxide), barium di-(p-nonylpnenoxide), barium di-(p-dodecylphenoxide), barium di-(α-naphthoxide), barium di-(β-naphthoxide), barium (o-methoxyphenoxide), barium di-(m-methoxyphenoxide), barium di-(p-methoxyphenoxide), barium (o-ethoxyphenoxide), barium di-(4-methoxy-1-naphthoxide) and the like. Particularly, the barium compound having the following general formula:

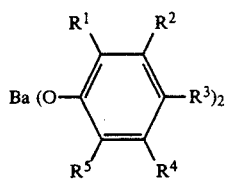

wherein $R^1 \sim R^5$ are hydrogen atom or an alkyl or alkoxy group having a carbon number of 1~20, is preferable in view of its performances.

Furthermore, there is used a partially hydrolyzed compound in which 0.1~0.5 equivalent of alkoxide or phenoxide group per 1 atom of barium is replaced with a hydroxyl group.

Moreover, as the β-component, mention may be made of calcium compounds and strontium compounds corresponding to the above barium compounds.

The amount of the β-component used is within a range of 0.01~20 equivalent, preferably 0.1~10 equivalent per 1 gram atom of the metal atom in the organomagnesium compound or organic alkali metal compound used as the α-component.

The organoaluminum compound as the γ-component is a compound represented by a general formula of $AlR^6R^7R^8$ ($R^6$, $R^7$ and $R^8$ are the same or different and are hydrogen atom or a hydrocarbon residue having a carbon number of 1~8 provided that all of them are not hydrogen), a concrete example of which may include trimethyl aluminum, triethyl aluminum, triisopropyl aluminum, tributyl aluminum, triisobutyl aluminum, trihexyl aluminum, tricyclohexyl aluminum, diisobutyl aluminum hydride, diethyl aluminum hydride, dipropyl aluminum hydride, ethyl aluminum dihydride, propyl aluminum dihydride, isobutyl aluminum dihydride and so on.

The amount of the γ-component used is within a range of 0.02~2.0 equivalent, preferably 0.1~1.5 equivalent per 1 gram atom of the metal atom in the organomagnesium compound or organic alkali metal compound used as the α-component.

In the preparation of the catalyst, a conjugated diene may be used as a catalyst component in an amount of 0.05~20 mol per 1 mol of the γ-component, if necessary, in addition to the above α-, β- and γ-components. Such a conjugated diene includes isoprene, 1,3-butadiene, 1,3-pentadiene and the like as used in the polymerization.

The conjugated diene as a catalyst component is not essential, but when it is used together with the above three components, the catalytic activity of the catalyst is more enhanced.

In the preparation of the catalyst, the α- to γ-components are dissolved, for example, in an inert organic solvent and reacted with the conjugated diene, if necessary. In this case, the addition order of these components is optional. It is preferable to previously mix, react and age these components from viewpoints of the enhancement of polymerization activity and shortening of polymerization starting and inducing time, but each of these catalytic components may directly and successively added to the solvent and monomers in the polymerization.

The polymerization solvent is an inert organic solvent, which includes, for example, aromatic hydrocarbon solvents such as benzene, toluene, xylene and the like; aliphatic hydrocarbon solvents such as n-pentane, n-hexane, n-butane and the like; alicyclic hydrocarbon solvents such as methylcyclopentane, cyclohexane and the like; and a mixture thereof.

The polymerization temperature is usually $-20 \sim 150°$ C., preferably $30 \sim 120°$ C. The polymerization reaction is a batch type or a continuous type.

Moreover, the concentration of the monomer in the solvent is usually 5~50% by weight, preferably 10~35% by weight.

In the production of the polymer, it is necessary to take a care for preventing the incorporation of a compound having a deactivation function such as oxygen, water, carbon dioxide gas or the like into the polymerization system in order to deactivate the catalyst system and the polymer according to the invention.

As a conjugated diene polymerizable in the presence of the catalyst system according to the invention, mention may be made of 1,3-butadiene, isoprene, 2,3-dimethyl-1,3-butadiene, 1,3-pentadiene, millcene and the like. These compounds may be used alone or in admixture. Preferably, 1,3-butadiene is used.

In the polymerization of such a conjugated diene, the following barium series catalysts may be mentioned:

1 a catalyst consisting of an alcoholate of barium, strontium or calcium, an organoaluminum compound and an organomagnesium compound described in Japanese Patent Application Publication No. 62-35,401;

2 a catalyst consisting of a barium alcoholate and an organolithium described in Japanese Patent Application Publication No. 62-21,002 or Japanese Patent Application Publication No. 56-45,401;

3 a catalyst consisting of a composite complex of barium, strontium or calcium and organoaluminum and a Lewis base or lithium alcoholate or lithium phenolate described in Japanese Patent Application Publication No. 60-2,323 or Japanese Patent laid open No. 56-157,409;

4 a catalyst consisting of organolithium/barium alcoholate or phenolate/organoaluminum/lithium salt of diethylene glycol monoalkylether or lithium salt of 2-N-dialkylamino ethanol described in Japanese Patent Application Publication No. 57-34,843;

5 a catalyst consisting of organolithium/barium alcoholate or phenolate or carboxylate/organoaluminum or organozinc described in Japanese Patent Application Publication No. 52-30,543, Japanese Patent laid open No. 56-157,411 or Japanese Patent laid open No. 56-157,410;

6 a catalyst consisting of a barium alcoholate or phenolate, an organolithium, an organomagnesium and an organoaluminum described in Japanese Patent laid open No. 56-11,296 or Japanese Patent Application Publication No. 60-26,406;

7 a catalyst consisting of a barium alcoholate and an organomagnesium described in Japanese Patent Application Publication No. 52-48,910 or Japanese Patent laid open No. 50-123,628.

According to the invention, the conjugated diene can be (co)polymerized in an inert organic solvent through a catalyst system consisting of the above α- to γ-components. The thus obtained (co)polymer has a trans bond in diene portion of 70~90%, preferably 75~87% and a content of bound aromatic vinyl compound of 2~10% by weight, preferably 5~8% by weight. When the trans bond in diene portion is less than 70%, the tensile strength and wear resistance are poor, while when it exceeds 90%, the rebound resilience lowers.

The rubber composition for tire according to the invention comprises a novel (co)polymer in which the polymer terminal of the above obtained (co)polymer is modified by reacting with a particular compound to introduce a functional group.

By such a modification, the effect of improving rebound resilience, wear resistance, heat build-up and mechanical properties is obtained.

In the production of the modified polymer A according to the invention, the particular compound to be reacted with the (co)polymer is at least one compound selected from the group consisting of (a) isocyanate compounds and/or isothiocyanate compounds (hereinafter referred to as a-component), (b) isocyanuric acid derivatives and/or thiocarbonyl containing compounds thereof (hereinafter referred to as b-component), (c) urea compounds (hereinafter referred to as c-component), (d) amide compounds and/or imide compounds (hereinafter referred to as d-component), (e) N-alkyl substituted oxazolydinone compounds (hereinafter referred to as e-component), (f) pyridyl substituted ketone compounds and/or pyridyl substituted vinyl compounds (hereinafter referred to as f-component), (g) lactam compounds (hereinafter referred to as g-component), (h) diesters of dicarboxylic acids (hereinafter referred to as h-component), (i) xanthogen compounds (hereinafter referred to as i-component), (j) dithio acid compounds (hereinafter referred to as j-component), (k) phosphoryl chloride compounds (hereinafter referred to as k-component), (l) silane compounds and/or alkoxysilane compounds (hereinafter referred to as l-component) and (m) carbonate compounds (hereinafter referred to as m-component).

Among these compounds, the isocyanate compound or isothiocyanate compound as the a-component concretely includes 2,4-tolyllene diisocyanate, 2,6-tolyllene diisocyanate, diphenylmethane diisocyanate, polymetallic type diphenylmethane diisocyanate (C-MDI), phenyl isocyanate, isophorone diisocyanate, hexamethylene diisocyanate, butyl isocyanate, 1,3,5-benzene triisocyanate, phenyl isothiocyanate, phenyl-1,4-dithioisocyanate and so on.

As the isocyanuric acid derivative or its corresponding thiocarbonyl containing compound of the b-component, mention may be made of carbamic acid derivatives such as methyl carbamate, methyl N,N-diethylcarbamate and the like; isocyanuric acid derivatives such as isocyanuric acid, N,N',N'-trimethyl isocyanuric acid and the like; and thiocarbonyl containing compounds corresponding to these derivatives.

As the urea compound of the c-component, mention may be made of N,N'-dimethyl urea, N,N'-diethyl urea, N,N, N',N'-tetramethyl urea, N,N-dimethyl-N',N'-diphenyl urea and the like.

As the amide compound or imide compound of the d-component, mention may be made of N,N-dimethyl formamide, acetoamide, N,N-diethyl acetoamide, aminoacetoamide, N,N-dimethyl-N',N'-dimethylamino acetoamide, N,N-dimethylamino acetoamide, N,N-diethylamino acetoamide, N,N-dimethyl-N',N'-diethylamino acetoamide, acrylamide, N,N-dimethyl acrylamide, N,N-dimethyl methacrylamide, nicotine amide, isonicotine amide, picoline acid amide, N,N-dimethyl isonicotine amide, succinic acid amide, phthalic acid amide, N,N,N',N'-tetramethyl phthalic acid amide, oxamide, N,N,N',N'-tetramethyl oxamide, 2-furane carboxylic acid amide, N,N-dimethyl-2 furane carboxylic acid amide, quinoline-2-carboxylic acid amide, N-ethyl N-methylquinoline carboxylic acid amide, succinic acid imide, N-methyl succinic acid imide, maleimide, N-methyl maleimide, phthalimide, N-methyl phthalimide and so on.

As the N alkyl substituted oxazolidinone compound of the e-component, mention may be made of 1,3-diethyl-2-imidazolidinone, 1,3-dimethyl-2-imidazolidinone, 1,1-dipropyl-2-imidazolidinone, 1-methyl-3-ethyl-2-imidazolidinone, 1-methyl-3-propyl-2-imidazolidinone, 1-methyl-3-(2-methoxyethyl)-2-imidazolidinone, 1-methyl-3-(2-ethoxyethyl)-2-imidazolidinone, 1,3-di-(2-ethoxyethyl)-2-imidazolidinone and so on.

The pyridyl substituted ketone compound or pyridyl substituted vinyl compound of the f-component concretely includes methyl-2-pyridylketone, methyl-4-pyridylketone, propyl-2-pyridylketone, di-4-pyridylketone, propyl-3-pyridylketone, 2-benzoyl pyridine, 2-vinyl pyridine, 4-vinyl pyridine and so on.

As the lactam compound of the g-component, mention may be made of N-methyl-2-pyrolidone, 2-piperidone, N-methyl-2-piperidone, 2-quinolone, N-methylquinolone and so on.

The dicarboxylic acid diester of the h-component is a compound having two ester bonds in its molecule, an example of which includes dimethyl adipate, diethyl adipate, di-n-butyl adipate, dimethyl maleate, diethyl maleate, di-nbutyl maleate, di-n-octyl maleate and a mixture thereof.

The xanthogen compound of the i-component is a compound having a group represented by a general formula of $$R^1-O-\overset{\overset{S}{\|}}{C}-S-,$$

which includes alkyl xanthogenic acids such as methyl xanthogenic acid, ethyl xanthogenic acid, n-propyl xanthogenic acid, isopropyl xanthogenic acid, n-butyl xanthogenic acid, sec-butyl xanthogenic acid, n-hexyl xanthogenic acid, n-octyl xanthogenic acid and so on; aryl xanthogenic acids such as phenyl xanthogenic acid, p-tolyl xanthogenic acid and so on; lithium, sodium and potassium salts of these xanthogenic acids; and xanthogen disulfides such as dimethyl xanthogen disulfide, diethyl xanthogen disulfide, di-n-propyl xanthogen disulfide, diisopropyl xanthogen disulfide, di-n-butyl xanthogen disulfide, di-sec-butyl xanthogen disulfide, di-n-hexyl xanthogen disulfide, diphenyl xanthogen disulfide, di-p-tolyl xanthogen disulfide and so on.

The dithio acid compound of the j-component is a compound having a group represented by a general formula of $$R^2-\overset{\overset{S}{\|}}{C}-S-$$

($R^2$ is an alkyl group or an aryl group), which includes dithioformic acid, dithioacetic acid and the the like.

The phosphoryl chloride compound of the k-component is represented by the following general formula:

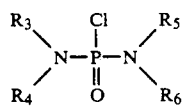

(wherein $R^3$, $R^4$, $R^5$ and $R^6$ are an alkyl group, respectively), and includes bis(dimethylamino) phosphoryl chloride, bis(diethylamino) phosphoryl chloride, bis(dipropylamino) phosphoryl chloride, bis(diisopropyl) phosphoryl chloride and so on.

The l-component is a silane compound and/or alkoxy silane compound represented by the following general formula:

$$X_nSiR^7{}_m(OR^8)_{4-n-m}$$

(wherein X is a halogen atom of Cl, Br or I, $R^7$ is a hydrogen atom or an alkyl group or an aminoalkyl group, $R^8$ is an alkyl group or an aryl group, n is an integer of 0~4, m is an integer of 0~2, and $4-n-m\geq 0$), and includes tetrachloro silane, tetrabromo silane, methyltrichloro silane, phenyltrichloro silane, hexyltribromo silane, dimethyldichloro silane, diethyldichloro silane, diphenyldibromo silane, phenylethylchloro silane, diethylchloro silane, trimethylchloro silane, tetraquis(2-ethylhexyloxy) silane, tetraphenoxy silane, methyltris(2-ethylhexyloxy) silane, ethyltris(2-ethylhexyloxy) silane, ethyltriphenoxy silane, vinyltris(2-ethylhexyloxy) silane, vinyltriphenoxy silane, methylvinylbis(2-ethylhexyloxy) silane, ethylvinyldiphenoxy silane, tri-t-butoxymonochloro silane, triphenoxymonochloro silane, monochloromethyldiphenoxy silane, monochloromethylbis(2-ethylhexyloxy) silane, monobromoethyldiphenoxy silane, monobromovinyldiphenoxy silane, monobromoisopropenylbis(2-ethylhexyloxy) silane, dichloro-di-t-butoxy silane, ditolyldichloro silane, di-t-butoxydiiodo silane, diphenoxydiiodo silane, methyltris(2-methylbutoxy) silane, vinyltris(2-methylbutoxy) silane, monochloromethylbis(2-methylbutoxy) silane, vinyltris(3-methylbutoxy) silane, 3-dimethylaminomethyl trimethoxy silane, 3-dimethylaminoethyl trimethoxy silane, 3-dimethylaminopropyl trimethoxy silane, 3-dimethylaminobutyl trimethoxy silane, 3-dimethylaminomethyl dimethoxymethyl silane, 3-dimethylaminoethyl dimethoxymethyl silane, 3-dimethylaminopropyl dimethoxymethyl silane, 3-dimethylaminobutyl dimethoxymethyl silane, 3-dimethylaminomethyl triethoxy silane, 3-dimethylaminoethyl triethoxy silane, 3-dimethylaminopropyl triethoxy silane, 3-dimethylaminobutyl triethoxy silane, 3-dimethylaminomethyl diethoxymethyl silane, 3-dimetylaminoethyl diethoxymethyl silane, 3-dimethylaminopropyl diethoxymethyl silane, 3-dimethylaminobutyl diethoxymethyl silane and the like.

As the m-component, mention may be made of diethyl carbonate, phenylethyl carbonate, diphenyl carbonate, ethylene carbonate and so on.

Then, the tin compound of monofunctionality or difunctionality used in the production of the modified polymer B may be represented by the following general formula:

$$Sn(R^9)_a(R^{10})_b(X)_c$$

(wherein $R^9$ is an alkyl group, $R^{10}$ is an aryl group or a benzyl group, X is at least one functional group selected from halogen atoms, alkoxy group and carboxyl group, and a, b, and c are 0 or an integer of 1 or more, $a+b+c=4$, provided that c is 1 or 2 and $a+b>2$).

As the tin compound, mention may be made of triphenyl tin chloride, diphenyl tin dichloride, tri-o-tolyl tin chloride, tri-m-tolyl tin chloride, triphenyl tin bromide, tribenzyl tin chloride, dibenzyl tin dichloride, benzylphenyl tin dichloride, tributyl tin chloride, dibutyl tin dichloride, trimethyl tin chloride, dimethyl tin dichloride, tributyl tin bromide, triphenyl tin phenoxide, triphenyl tin stearate, triphenyl tin laurate, triphenyl tin octoate, triphenyl tin oleate, diphenyl tin laurate, diphenyl tin distearate, diphenyl tin dioctoate, diphenyl tin dioleate, tributyl tin stearate, tributyl tin laurate, tributyl tin octoate, dibutyl tin distearate, dibutyl tin dilaurate, dibutyl tin dioctoate, dioctyl tin distaerate, dioctyl tin dilaurate and the like. These compounds may be used alone or in admixture.

Further, the tin compounds of trifunctionality or tetrafunctionality used in the production of the modified polymer C are compounds having halogen-tin bond, aryl-tin bond, alkoxy-tin bond or vinyl-tin bond, preferably compounds having halogen-tin bond. They concretely include methyltrichloro tin, butyltrichloro tin, phenyltrichloro tin, tetrachloro tin, tetrabromo tin, triphenyl tin chloride, tetraethoxy tin, diphenyl tin dichloride, divinyldichloro tin, tetravinyl tin, tetraallyl tin, bis(methyldichlorostanyl) ethane, bis(trichlorostanyl) ethane, tetraphenyl tin, tetratolyl tin, bis(trichlorostanyl) ethane and the like. These tin compounds may be used alone or in admixture.

Each of the above compounds for polymer modification may be added in an amount of 0.05~10 equivalent, preferably 0.1~5 equivalent as a functional group per 1 gram atom of barium atom in the β-component.

The living polymer of the aforementioned butadiene series polymer is reacted with the above compound at a reaction temperature of room temperature to 120° C., preferably 50~100° C. for a reaction time of few seconds to few hours.

After the completion of the reaction, steam is blown into the polymer solution to remove the solvent, or a poor solvent such as methanol or the like is added to solidify the butadiene polymer, and then dried on hot roll or under a reduced pressure to obtain the modified butadiene polymer as the polymer A, B or C.

Alternatively, the solvent may directly removed from the polymer solution under a reduced pressure to obtain the modified polybutadiene.

The component D constituting the rubber composition according to the invention is at least one rubber selected from natural rubber, high cis-1,4 polyisoprene rubber and styrene-butadiene copolymer rubber having a glass transition temperature of not higher than −50° C.

Among these rubbers, the styrene-butadiene copolymer rubber having the glass transition temperature of not higher than −50° C. usually has a bound styrene content of not more than 35% by weight and a vinyl content in polybutadiene portion of not more than 30%.

The component D is a rubber component required for maintaining the strength at rupture in the rubber composition according to the invention, and its amount used is within a range of 30~80 parts by weight, preferably 40~70 parts by weight per 100 parts by weight of the starting rubber. When the amount is outside the above range, the balance of vulcanization properties such as wear resistance, rebound resilience and heat build-up is not ensured.

Further, the component E constituting the starting rubber according to the invention is high cis1,4 polybutadiene and/or low cis-1,4 polybutadiene.

The high cis-1,4 polybutadiene has a cis-1,4 content of not less than 90%, while the low cis-1,4 polybutadiene has a cis-1,4 content of 25~40% and a vinyl content of 10~30%.

The amount of the component E used is not more than 30 parts by weight, preferably 0~20 parts by weight per 100 parts by weight of the starting rubber. When the amount exceeds 30 parts by weight, the tensile strength is poor and the processability lowers.

The rubber composition containing the modified polymer A, B or C and the components D and E as a starting rubber further contains a reinforcing carbon black, a process oil, an aliphatic carboxylic acid and a sulfur, and includes other additives such as vulcanization accelerator, antioxidant, processing assistant and the like, if necessary.

As the reinforcing carbon black, mention may be made of carbon blacks HAF, ISAF, SAF and so on. Preferably, carbon black having an iodine adsorption (IA) of not less than 60 mg/g and a dibutyl phthalate oil absorption (DBP) of not less than 80 ml/100 g. The amount of the carbon black used is 35~100 parts by weight, preferably 40~80 parts by weight per 100 parts by weight of the starting rubber. When the amount is less than 35 parts by weight, the tensile strength and wear resistance of the resulting vulcanizate are not sufficient, while when it exceeds 100 parts by weight, the rebound resilience, heat build-up and the like lower.

The process oil used for oil extension includes, for example, paraffinic oil, naphthenic oil, aromatic oil and so on. The aromatic oil is used for applications thinking much of tensile strength and wear resistance, while the naphthenic oil and paraffinic oil are used for applications thinking much of rebound resilience and low temperature properties. The amount of the process oil used is 0~50 parts by weight, preferably 0~40 parts by weight per 100 parts by weight of the starting rubber. When the amount exceeds 50 parts by weight, the tensile strength and rebound resilience of the vulcanizate are considerably degraded.

Further, the aliphatic carboxylic acid is used as a vulcanization assistant or a processing assistant, and concretely includes stearic acid, octanoic acid, laurylic acid, oleic acid and so on. The amount of the aliphatic carboxylic acid used is within a range of 0.5~5 parts by weight, preferably 1~3 parts by weight per 100 parts by weight of the starting rubber. When the amount is less than 0.5 part by weight, the dispersion of the vulcanizing agent is poor, while when it exceeds 5 parts by weight, the vulcanization rate becomes slow.

Moreover, sulfur is used as a vulcanizing agent, and its amount is within a range of 0.1~3 parts by weight, preferably 0.5~2 parts by weight per 100 parts by weight of the starting rubber. When the amount is less than 0.1 part by weight, the tensile strength, wear resistance and rebound resilience of the vulcanizate lower, while when it exceeds 3 parts by weight, the hardness becomes high to lose rubber elasticity.

The vulcanization accelerator is not particularly restricted but preferably uses sulfenamide series, guanidine series and thiuram series accelerators such as M (2-mercaptobenzothiazole), DM (dibenzothiazyldisulfide), CZ (N-cyclohexyl-2-benzothiazylsulfenamide) and so on. The amount of the accelerator used is within a range of 0.05~2.5 parts by weight, preferably 0.5~1.8 parts by weight per 100 parts by weight of the starting rubber.

Further, the rubber composition for tire according to the invention may be compounded with additives, for example, a filler such as silica, calcium carbonate, titanium oxide or the like; zinc oxide, antioxidant, ozone degradation preventing agent and so on.

The rubber composition for tire according to the invention is obtained by kneading various components and additives in a kneader such as roll, internal mixer or the like. After the shaping and vulcanization, the vulcanizate is used in tire applications such as tire tread, undertread, carcass, sidewall, bead portion and the like as well as the other applications such as hose, belt, shoe bottom, window frame, sealing material, rubber insulator and other industrial articles. Particularly, the rubber composition according to the invention is preferably used in the tire tread.

The following examples are given in the illustration of the invention and are not intended as limitations thereof.

In the examples, part and % are by weight, respectively, unless otherwise stated.

The various properties in the examples are measured by the following methods.

The Mooney viscosity was measured at a temperature of 100° C. for 4 minutes after the preliminary heating of 1 minute (according to JIS K6300).

The microstructure of the polymer was determined by an infrared spectrum method (Morero's method).

The ratio of branched polymer was measured by a change of Mooney viscosity before and after the reaction between the living polymer just after the polymerization in the presence of the catalyst system and the tin compound or by model reaction at a number average molecular weight of several thousands, and confirmed by GPC analysis and infrared analysis.

The properties of the vulcanizate were carried out by compounding the starting rubbers and other components according to the following compounding recipe and kneading them in a Brabender of 230 cc and a roll of 6 inch and then vulcanizing at 145° C. for a given time.

| Compounding recipe | (part) |
|---|---|
| starting rubber | 100 |
| carbon black SAF | 50 |
| stearic acid | 2 |
| zinc white | 3 |
| antioxidant (810NA)[*1] | 1 |
| (TP)[*2] | 0.8 |
| vulcanization accelerator (MSA-G)[*3] | 1.0 |
| sulfur | 1.5 |

[*1]N-phenyl-N'-isopropyl-p-phenylenediamine
[*2]N,N'-diallyl-p-phenylenediamine
[*3]N-oxydiethylene-2-benzothiazolesulfenamide The roll processability was evaluated by four stages, 4 good to 1 poor, after observing the wound state of rubber sheet onto the roll of 6 inch and the sheet surface.

The extrusion processability was evaluated by four stages, 4 best to 1 poor, after observing the extrusion amount and the rubber sheet surface and edge when the rubber composition was introduced into a slit die rheometer.

The tensile properties (tensile strength) were measured according to a method of JIS K6301.

The rebound resilience was measured at 70° C. by means of a Dunlop tripsometer.

The heat build-up (Goodrich heat build-up) was evaluated by using a Goodrich flexometer, wherein the rising temperature after 20 minutes was measured under conditions that load was 48 pounds, displacement was 0.225 inch, start temperature was 50° C. and revolution number was 1,800 rpm.

The wear resistance (Lambourn wear index) was evaluated from a worn amount (cc/min) measured at a slip ratio of 25% by means of a Lambourn type wear testing machine and represented by an index on the basis that the vulcanizate of Comparative Example 1 was 100. The larger the index value, the better the wear resistance. Moreover, the wear resistance was partially measured by means of a Pico wear testing machine.

Reference Example 1 (Preparation of polymer)

Polymer A

An inside of a reaction vessel of 7 λ capacity provided with a stirrer and a jacket was purged with nitrogen, into which were charged 2,400 g of previously purified cyclohexane and 500 g of 1,3-butadiene. After the reaction vessel was maintained at 70° C., a catalyst consisting of 7.2 millimol of n-butyllithium, 2.4 millimol of dinonylphenoxyl barium, 9.6 millimol of triethyl aluminum and 4.8 millimol of N,N-diethylaminoethoxy lithium and aged at 80° C. for 1 hour was added to the reaction vessel to start the polymerization and the polymerization reaction was carried out at 70° C. for 2 hours. To the resulting living polymer was added 0.72 millimol as an isocyanate group of polymeric type diphenylmethane diisocyanate to stop the polymerization.

Then, 2.5 g of 2,6-t-butyl-p-cresol was added to the resulting polymer solution and subjected to steam stripping to remove the solvent, which was dried on a roll at 110° C. to obtain a polymer. The result is shown in the following Table 1.

The thus obtained poly-1,3-butadiene had a microstructure that cis-1,4 bond was 10%, vinyl bond was 5% and trans-1,4 bond was 85%. The result is shown in Table 1.

Furthermore, GPC chart of this polymer is shown in FIG. 1. As seen from FIG. 1, molecular weight distribution measured by a differential refractometer and molecular weight distribution measured by ultraviolet ray (UV, 254 nm) appear in correspondence to GPC count, and UV absorption spectrum is large in the absorption intensity at lower molecular weight side and corresponds to the terminal number of the polymer.

Thus, even when 1,3-butadiene is polymerized alone by using the particular catalyst system used in the invention, it is apparent that the coupling reaction with the particular compound is caused likewise the case of the invention.

Reference Examples 2~10

1,3-butadiene (500 g) was polymerized by using the catalyst system shown in Table 1 in the same manner as in Reference Example 1 and then coupled with a compound shown in Table 1 to obtain polymers B J.

TABLE 1

| | Polymer | Catalyst system/millimol[*1] | | | |
|---|---|---|---|---|---|
| Reference Example 1 | A | n-butyllithium 7.2 | dinonylphenoxy barium 2.4 | triethyl aluminum 9.6 | N,N-diethylaminoethoxy lithium 4.8 |
| Reference Example 2 | B | dibutyl magnesium 12.2 | barium di-t-butoxide 2.43 | triethyl aluminum 2.25 | — |
| Reference Example 3 | C | dibutyl magnesium 9.9 | barium di-t-butoxide 1.98 | triethyl aluminum 1.83 | — |
| Reference Example 4 | D | dibutyl magnesium 12.2 | barium di-t-butoxide 2.43 | triethyl aluminum 2.25 | — |
| Reference Example 5 | E | dibutyl magnesium 9.9 | barium di-t-butoxide 1.98 | triethyl aluminum 1.83 | — |
| Reference Example 6 | F | n-butyllithium 3.75 | ROLi[*2] 2.5 | barium di-(p-nonylphenoxide) 1.25 | triethyl aluminum 5.0 |
| Reference Example 7 | G | n-butyllithium 4.5 | ROLi[*2] 3.0 | barium di-(p-nonylphenoxide) 1.5 | triethyl aluminum 6.0 |
| Reference | H | n-butyllithium | ROLi[*2] | barium di-(p- | triethyl aluminum |

TABLE 1-continued

| | | | | | |
|---|---|---|---|---|---|
| Example 8 | | 4.5 | 3.0 | nonylphenoxide) 1.5 | 6.0 |
| Reference Example 9 | I | dihexyl magnesium 9.9 | barium di-(p-nonylphenoxide) 1.98 | triethyl aluminum 1.83 | — |
| Reference Example 10 | J | dihexyl magnesium 7.0 | barium di-(p-nonylphenoxide) 1.41 | triethyl aluminum 1.31 | — |

| | Conversion ratio (%) | Compound (equivalent ratio)*3 | Microstructure (%) | | | Mooney viscosity | |
|---|---|---|---|---|---|---|---|
| | | | cis | vinyl | trans | before addition | after addition |
| Reference Example 1 | 95 | C-MDI*4 0.3 | 10 | 4 | 86 | 20 | 35 |
| Reference Example 2 | 92 | C-MDI 0.5 | 10 | 6 | 84 | 20 | 50 |
| Reference Example 3 | 91 | acrylic amide 0.5 | 10 | 6 | 84 | 25 | 41 |
| Reference Example 4 | 90 | C-MDI/tetrachloro tin 0.25/0.25 | 10 | 6 | 84 | 21 | 55 |
| Reference Example 5 | 90 | 1,3-diethyl-2-imidazolidinone 1.0 | 11 | 5 | 84 | 22 | 48 |
| Reference Example 6 | 90 | 2-vinyl pyridine 1.0 | 10 | 5 | 85 | <10 | 48 |
| Reference Example 7 | 91 | methyl-4-pyridyl ketone 1.0 | 10 | 5 | 85 | <10 | 41 |
| Reference Example 8 | 90 | N-methyl-2-piperidone 0.5 | 10 | 5 | 85 | <10 | 43 |
| Reference Example 9 | 90 | methyl N,N-diethyl carbamate 1.0 | 12 | 5 | 83 | 25 | 51 |
| Reference Example 10 | 90 | N,N',diethyl urea 1.0 | 12 | 5 | 83 | 31 | 45 |

*1 millimol per 100 g of monomer
*2 $(C_2H_5)_2NCH_2CH_2OLi$
*3 equivalent ratio of functional group such as iso(thio)cyanate group, carbonyl group, vinyl group, aldehyde group or the like per 1 g equivalent of barium atom in β-component
*4 polymeric type diphenylmethane diisocyanate (isocyanate group per 1 molecule = 2.6)

EXAMPLES 1~12

The polymers B~J obtained in Reference Examples 2~10 were used according to the aforementioned compounding recipe and then vulcanized. The properties of the resulting vulcanizates were evaluated to obtain results as shown in the following Table 2.

Comparative Examples 1~5

The above polymer B, commercially available styrene-butadiene rubber (#1500) and unmodified butadiene polymer (HT-BR) were used alone or in admixture and kneaded with other components according to the aforementioned compounding recipe in a Brabender of 230 cc and a roll of 6 inch, which was vulcanized at 145° C. for a given time to obtain a vulcanizate. The properties of the vulcanizate were measured to obtain results as shown in Table 2.

TABLE 2

| | | Polymer (part)/(part) | Tensile strength (kgf/cm²) | Elongation (%) | Wear resistance (Pico wear index) | Rebound resilience (%) |
|---|---|---|---|---|---|---|
| Example | 1 | B(30)/NR(70) | 277 | 450 | 135 | 68 |
| | 2 | C(30)/NR(70) | 280 | 465 | 132 | 67 |
| | 3 | D(30)/NR(70) | 288 | 440 | 133 | 67 |
| | 4 | E(30)/NR(70) | 282 | 465 | 132 | 68 |
| | 5 | F(30)/NR(70) | 275 | 460 | 130 | 70 |
| | 6 | G(30)/NR(70) | 277 | 425 | 138 | 67 |
| | 7 | H(30)/NR(70) | 218 | 440 | 132 | 67 |
| | 8 | B(50)/NR(50) | 265 | 430 | 135 | 68 |
| | 9 | B(30)/#1500(70) | 250 | 460 | 120 | 68 |
| | 10 | B(30)/HT-SBR(70) | 245 | 450 | 135 | 69 |
| | 11 | I(40)/NR(60) | 288 | 470 | 132 | 68 |
| | 12 | J(40)/NR(50)/BR(10) | 265 | 470 | 145 | 69 |
| Comparative Example | 1 | #1500 (100) | 250 | 440 | 100 | 52 |
| | 2 | NR(100) | 270 | 420 | 105 | 63 |
| | 3 | HT-BR(30)/NR(70) | 262 | 450 | 108 | 63 |
| | 4 | B(10)/NR(90) | 260 | 410 | 105 | 60 |
| | 5 | B(10)/#1500(90) | 255 | 435 | 102 | 53 |

REFERENCE EXAMPLE 11

An inside of a reaction vessel of 7 λ capacity provided with a stirrer and a jacket was purged with nitrogen, to which were charged 2,400 g of previously purified and dried cyclohexane and 300 g of 1,3-butadiene. Further, 300 g of 1,3-butadiene was supplied at a rate of 1.3 g/min from 30 minutes after the starting of polymerization.

Separately, a catalyst system was obtained by reacting 4.4 millimol of barium dinonylphenoxide with 17.6 millimol of triethyl aluminum and then reacting the resulting solution with 13.2 millimol of n-butyllithium, 8.8 millimol of lithium salt of N,N-diethylamino ethanol and 11 millimol of 1,3-butadiene, and then aged at 80° C. for 1 hour. The thus obtained catalyst system was charged into the reaction vessel, and thereafter the polymerization was carried out at 70° C. for 2 hours. The conversion ratio of the polymer is shown in the following Table 3. To the polymer solution was added 1.1 millimol of dimethyl adipate, which was reacted at 70° C. for 20 minutes.

REFERENCE EXAMPLES 12~17

1,3-butadiene was polymerized in the same manner as in Reference Example 11 and subjected to a modification reaction with a compound shown in Table 3.

EXAMPLE 17

The polymer O obtained in Reference Example 15 was vulcanized according to the same compounding recipe as in Example 1 except that the amount of carbon black was reduced from 50 parts to 40 parts and 20 parts of silica (Nipsil VN3, trade name) was added, and then the properties of the vulcanizate were measured in the same manner as in Example 1 to obtain results as shown in Table 4.

EXAMPLE 18

The same evaluation for the properties of vulcanizate as in Example 1 was repeated by using the polymer P obtained in Reference Example 16 to obtain results as shown in Table 4.

TABLE 3

| | Polymer | Conversion ratio (%) | Compound (equivalent ratio)*1 | Microstructure (%) cis | vinyl | trans | Mooney viscosity |
|---|---|---|---|---|---|---|---|
| Reference Example-11 | K | 90 | dimethyl adipate 0.25 | 10 | 6 | 84 | 48 |
| Reference Example-12 | L | 91 | phenyl xanthogenic acid 0.25 | 9 | 6 | 85 | 38 |
| Reference Example-13 | M | 90 | dithioformic acid 0.25 | 10 | 5 | 85 | 38 |
| Reference Example-14 | N | 90 | bis(dimethyl-amino) phosphoryl chloride 0.50 | 10 | 6 | 84 | 55 |
| Reference Example-15 | O | 95 | methyl-triphenoxy silane 4.0 | 10 | 5 | 85 | 46 |
| Reference Example-16 | P | 91 | 3-dimethyl-aminomethyl triphenoxy silane 5.0 | 11 | 6 | 83 | 53 |
| Reference Example-17 | Q | 92 | diphenyl carbonate 0.25 | 9 | 6 | 85 | 58 |

*1see Table 1

EXAMPLE 13~16

The polymers K~N obtained in Reference Examples 11~14 were vulcanized according to the same compounding recipe as in Example 1, and then the properties of the resulting vulcanizate were measured to obtain results as shown in the following Table 4.

EXAMPLE 19

The same evaluation for the properties of vulcanizate as in Example 1 was repeated by using the polymer Q obtained in Reference Example 17 to obtain results as shown in Table 4.

TABLE 4

| | Compounding recipe (part) carbon black | silica | Polymer | Tensile strength (kgf/cm$^2$) | Elongation (%) | Wear resistance (Pico wear index) | Rebound resilience (%) |
|---|---|---|---|---|---|---|---|
| Example-13 | 50 | — | K(30)/NR(70) | 260 | 420 | 120 | 68 |
| Example-14 | 50 | — | L(30)/NR(70) | 254 | 430 | 135 | 67 |
| Example-15 | 50 | — | M(30)/NR(70) | 245 | 450 | 142 | 69 |
| Example-16 | 50 | — | N(30)/NR(70) | 260 | 470 | 135 | 65 |
| Example-17 | 40 | 20 | O(30)/NR(70) | 265 | 550 | 130 | 72 |
| Example-18 | 40 | 20 | P(30)/NR(70) | 270 | 560 | 125 | 71 |
| Comparative Example-6 | 40 | 20 | HT-BR(30)/NR(70) | 230 | 320 | 90 | 64 |
| Example-19 | 50 | — | Q(30)/NR(70) | 250 | 440 | 110 | 65 |

Reference Examples 18~27

Polymer R-1

1,3-butadiene was polymerized in the same manner as in Reference Example 11, and subjected to branching reaction with 1.25 millimol of tetrachloro tin ($SnCl_4$) to obtain a polymer R-1. The result is shown in the following Table 5.

POLYMERS R-2 AND R-3

The same polymerization as in Polymer R-1 was repeated, except that the amount of the catalyst used was adjusted to 1.2 times or 0.8 times, to obtain polymers R-2 and R-3. The results are shown in Table 5.

Polymer R-4

The same polymerization as in Polymer R-1 was repeated for 45 hours, except that 1.3 millimol of di-t-butoxy barium, 6.6 millimol of dibutyl magnesium and 1.4 millimol of triethyl aluminum were aged at 80° C. for 15 minutes as a catalyst, to obtain a polymer R-4. The result is shown in Table 5.

Polymer R-5

The same polymerization as in Polymer R-1 was repeated, except that 0.1 millimol of tetrachloro tin was used, to obtain a polymer R 5. The result is shown in Table 5.

Polymers R-6 and R-7

The same polymerization as in Polymer R-1 was repeated, except that the catalyst amount was adjusted to 1.5 times or 0.65 times, to obtain polymers R-6 and R-7. The results are shown in Table 5.

Polymer R-8

The same polymerization as in Polymer R-1 was repeated, except that 1.25 millimol of butyltrichloro tin ($BuSnCl_3$) was used instead of tetrachloro tin, to obtain a polymer R-8. The result is shown in Table 5.

Polymer R-9

The same polymerization as in Polymer R-1 was repeated except that a catalyst system consisting of 4.0 millimol of n-butyllithium and 2.0 millimol of di-t-butoxy barium was used without aging. The result is shown in Table 5.

Polymer R-10

The same polymerization as in Polymer R-1 was repeated, except that 3.3 millimol of di-t-butoxy barium, 6.6 millimol of dibutyl magnesium and 1.4 millimol of triethyl aluminum were aged at 80° C. for 15 minutes as a catalyst, to obtain a polymer R-10. The result is shown in Table 5.

TABLE 5

| | Polymer | Mooney viscosity | trans-1,4 content (%) | vinyl content (%) | Kind of branching agent | Branched polymer (%) |
|---|---|---|---|---|---|---|
| Reference Example-18 | R-1 | 42 | 78 | 7 | $SnCl_4$ | 39 |
| Reference Example-19 | R-2 | 32 | 78 | 7 | $SnCl_4$ | 40 |
| Reference Example-20 | R-3 | 70 | 78 | 7 | $SnCl_4$ | 40 |
| Reference Example-21 | R-4 | 40 | 84 | 5 | $SnCl_4$ | 31 |
| Reference Example-22 | R-5 | 41 | 78 | 7 | $SnCl_4$ | 5 |
| Reference Example-23 | R-6 | 20 | 78 | 7 | $SnCl_4$ | 38 |
| Reference Example-24 | R-7 | 105 | 78 | 7 | $SnCl_4$ | 41 |
| Reference Example-25 | R-8 | 40 | 78 | 7 | $BuSnCl_3$ | 35 |
| Reference Example-26 | R-9 | 43 | 67 | 12 | $SnCl_4$ | 37 |
| Reference Example-27 | R-10 | 42 | 71 | 10 | $SnCl_4$ | 35 |

EXAMPLES 20~28, COMPARATIVE EXAMPLES 7~11

The polymers R-1 to R-10 obtained in Reference Examples 18~27, and natural rubber (RSS No. 1) or high cis-1,4 polyisoprene rubber (made by Japan Synthetic Rubber Co., Ltd., JSR IR 2200, trade name) or emulsion polymerized SBR (made by Japan Synthetic Rubber Co., Ltd., JSR SBR 1500, trade name) or high cis-1,4-polybutadiene (made by Japan Synthetic Rubber Co., Ltd., JSR BR OI, trade name) were kneaded according to the aforementioned compounding recipe in a Bunbary mixer of 1.7 λ and a roll of 6 inch and vulcanized at 145° C. for a given time. The properties of the resulting vulcanizate were measured to obtain results as shown in the following Table 6.

TABLE 6

| | Example 20 | Example 21 | Example 22 | Example 23 | Example 24 | Example 25 | Example 26 |
|---|---|---|---|---|---|---|---|
| Rubber compounding recipe (part) | | | | | | | |
| polymer used/part | R-1/50 | R-1/50 | R-1/50 | R-1/50 | R-2/50 | R-3/50 | R-4/50 |
| natural rubber | 50 | 40 | 40 | 40 | 50 | 50 | 50 |
| high cis-polyisoprene | — | 10 | — | — | — | — | — |
| emulsion polymerized SBR | — | — | — | 10 | — | — | — |
| high cis-polybutadiene | — | — | 10 | — | — | — | — |

TABLE 6-continued

| Test results | | | | | | | |
|---|---|---|---|---|---|---|---|
| roll processability | 4 | 4 | 4 | 4 | 4 | 4 | 4 |
| extrusion processability | 4 | 4 | 4 | 4 | 4 | 4 | 4 |
| tensile strength (kg · f/cm$^2$) | 260 | 262 | 258 | 265 | 257 | 265 | 270 |
| rebound resilience (70° C., %) | 69 | 69 | 70 | 69 | 69 | 70 | 68 |
| Goodrich heat build-up (ΔT, °C.) | 16 | 16 | 15 | 16 | 16 | 15 | 17 |
| Lambourn wear index | 130 | 130 | 128 | 135 | 130 | 133 | 140 |

| | Example 27 | Example 28 | Comparative Example 7 | Comparative Example 8 | Comparative Example 9 | Comparative Example 10 | Comparative Example 11 |
|---|---|---|---|---|---|---|---|
| Rubber compounding recipe (part) | | | | | | | |
| polymer used/part | R-8/50 | R-10/50 | R-5/50 | R-6/50 | R-7/50 | R-9/50 | — |
| natural rubber | 50 | 50 | 50 | 50 | 50 | 50 | 50 |
| high cis-polyisoprene | — | — | — | — | — | — | — |
| emulsion polymerized SBR | — | — | — | — | — | — | — |
| high cis-polybutadiene | — | — | — | — | — | — | 50 |
| Test results | | | | | | | |
| roll processability | 4 | 4 | 4 | 4 | 3 | 4 | 4 |
| extrusion processability | 4 | 3 | 4 | 4 | 2 | 4 | 2 |
| tensile strength (kg · f/cm$^2$) | 261 | 248 | 240 | 242 | 245 | 240 | 250 |
| rebound resilience (0° C., %) | 69 | 68 | 66 | 66 | 68 | 67 | 65 |
| Goodrich heat build-up (ΔT, °C.) | 16 | 16 | 19 | 19 | 17 | 18 | 20 |
| Lambourn wear index | 130 | 125 | 100 | 100 | 130 | 95 | 110 |

Reference Examples 28~34

An inside of a reaction vessel of 7 λ capacity provided with a stirrer and a jacket was purged with nitrogen, to which were charged 2,400 g of previously purified and dried cyclohexane and 600 g of 1,3-butadiene.

A catalyst system previously obtained by aging dibutyl magnesium, triethyl aluminum and di-t-butoxy barium in amounts shown in the following Table 7 per 100 g of monomer at 80° C. for 20 minutes was charged into the reaction vessel, and then the polymerization was carried out at 70° C. for 3 hours, during which the conversion ratio of the polymer reached to about 90%. At this time, 10 millimol of tetrahydrofuran was added to the resulting polymer solution, and then a tin compound of monofunctionality or difunctionality shown in Table 7 was further added to conduct the reaction at 70° C. for 1 hour.

Then, the polymer solution was added with 0.5 g of 2,6-t-butyl-p-cersol per 100 g of the polymer and subjected to steam stripping to remove the solvent, dried on a roll at 110° C. to obtain polymers S-1 to S-7. The polymerization results are shown in Table 7.

TABLE 7

| | Polymer | Catalyst kind/amount (millimol) | | | Conversion ratio (%) |
|---|---|---|---|---|---|
| Reference Example 28 | S-1 | dibutyl magnesium 4.2 | triethyl aluminum 0.8 | di-t-butoxy barium 0.84 | 90 |
| Reference Example 29 | S-2 | dibutyl magnesium 4.2 | triethyl aluminum 0.8 | di-t-butoxy barium 0.84 | 92 |
| Reference Example 30 | S-3 | dibutyl magnesium 4.2 | triethyl aluminum 0.8 | barium dinonylphenoxide 0.84 | 88 |
| Reference Example 31 | S-4 | dibutyl magnesium 5.0 | triethyl aluminum 0.9 | di-t-butoxy barium 1.0 | 95 |
| Reference Example 32 | S-5 | dibutyl magnesium 4.2 | triethyl aluminum 0.8 | di-t-butoxy barium 0.84 | 94 |
| Reference Example 33 | S-6 | dibutyl magnesium 4.2 | triethyl aluminum 0.8 | di-t-butoxy barium 0.84 | 93 |
| Reference Example 34 | S-7 | dibutyl magnesium 5.0 | triethyl aluminum 0.9 | di-t-butoxy barium 1.0 | 90 |

| | Tin compound kind/ amount (millimol) | Mooney viscosity | Microstructure of polymer (%) | | Content of tin atom (ppm) | Ratio of unbranched polymer (%) |
|---|---|---|---|---|---|---|
| | | | trans-1,4 | vinyl | | |
| Reference Example 28 | triphenyl tin chloride 0.84 | 56 | 84 | 6 | 210 | 100 |
| Reference Example 29 | triphenyl tin chloride 0.84 | 52 | 84 | 6 | 200 | 95 |
| Reference | dibutyl tin dilaurate | 48 | 83 | 6 | 220 | 90 |

TABLE 7-continued

| | | | | | | |
|---|---|---|---|---|---|---|
| Example 30 | 0.84 | | | | | |
| Reference Example 31 | triphenyl tin chloride/0.6 tin tetrachloride/0.1 | 60 | 86 | 5 | 180 | 90 |
| Reference Example 32 | triphenyl tin chloride 0.30 | 58 | 84 | 6 | 70 | 100 |
| Reference Example 33 | triphenyl tin chloride 0.15 | 61 | 84 | 6 | 40 | 100 |
| Reference Example 34 | tin tetrachloride 0.1 | 55 | 85 | 5 | 25 | 80 |

EXAMPLES 29~35, COMPARATIVE EXAMPLES 12~14

The polymers S-1 to S-7 obtained in Reference Examples 28~34 were kneaded in an amount as shown in the following Table 8 according to the aforementioned compounding recipe in a Brabender of 230 cc and a roll of 6 inch, and then vulcanized at 145° C. for a given time. The properties of the vulcanizates were measured to obtain results as shown in Table 8. In Table 8, NR was natural rubber (RSS No. 1), and E-SBR was an emulsion polymerized styrene-butadiene copolymer rubber (made by Japan Synthetic Rubber Co., Ltd., JSR SBR 1500, trade name, bound styrene content: 23.5%, Mooney viscosity: 52).

TABLE 8

| | Example 29 | Example 30 | Example 31 | Example 32 | Example 33 | Example 34 | Example 35 | Comparative Example 12 | Comparative Example 13 | Comparative Example 14 |
|---|---|---|---|---|---|---|---|---|---|---|
| Kind of starting rubber | S-1/30 NR/70 | S-2/30 NR/70 | S-3/30 NR/70 | S-4/40 NR/60 | S-5/50 NR/50 | S-1/70 NR/30 | S-1/70 E-SBR/30 | S-6/100 | S-7/100 | S-BR/100 |
| Mooney viscosity | 109 | 108 | 105 | 88 | 108 | 95 | 90 | 128 | 120 | 92 |
| Properties of vulcanizate | | | | | | | | | | |
| 300% modulus (kg · f/cm$^2$) | 158 | 156 | 153 | 150 | 152 | 152 | 154 | 115 | 108 | 105 |
| tensile strength (kg · f/cm$^2$) | 270 | 272 | 275 | 265 | 275 | 280 | 265 | 210 | 205 | 185 |
| elongation (%) | 420 | 460 | 430 | 480 | 470 | 500 | 490 | 460 | 430 | 370 |
| rebound resilience (%) | 74 | 75 | 72 | 73 | 74 | 74 | 72 | 68 | 69 | 64 |
| Lambourn wear index | 138 | 130 | 142 | 133 | 128 | 130 | 135 | 110 | 105 | 100 |
| tan δ | 0.092 | 0.090 | 0.090 | 0.091 | 0.095 | 0.091 | 0.088 | 0.112 | 0.105 | 0.120 |

The rubber compositions for tire according to the invention are not only good in the processabilities such as roll processability and extrusion processability but also excellent in the vulcanization properties such as wear resistance, heat build-up, rebound resilience, tensile strength and the like, so that they are particularly suitable for a tread in various tires inclusive of passenger car tires, truck and bus tires.

What is claimed is:

1. A rubber composition for tire comprising 20~70 parts by weight of a butadiene polymer having a trans-1,4 content of 70~90%, a vinyl content of 2~10% and a Mooney viscosity (ML$_{1+4}$, 100° C.) of 30~100 and modified at the terminal thereof with a compound selected from the group consisting of (a) isocyanate compounds and/or isothiocyanate compounds, (b) isocyanuric acid derivatives and/or thiocarbonyl containing compounds thereof, (c) urea compounds, (d) amide compounds and/or imide compounds, (e) N-alkyl substituted oxazolydinone compounds, (f) pyridyl substituted ketone compounds and/or pyridyl substituted vinyl compounds, (g) lactam compounds, (h) diesters of dicarboxylic acids, (i) xanthogen compounds, (j) dithio acid compounds, (k) phosphoryl chloride compounds, (l) silane compounds and/or alkoxysilane compounds and (m) carbonate compounds, 30~80 parts by weight of at least one rubber selected from natural rubber, high cis-1,4 polyisoprene rubber and styrene-butadiene copolymer rubber having a glass transition temperature of not higher than -50° C. and 0~30 parts by weight of high cis-1,4 polybutadiene and/or low cis-1,4 polybutadiene, and containing 35~100 parts by weight of carbon black, 0~50 parts by weight of process oil, 0.5~5 parts by weight of aliphatic carboxylic acid and 0.1~3 parts by weight of sulfur based on 100 parts by weight of total amount of the above rubber components.

2. A rubber composition for tire comprising 20~70 parts by weight of a butadiene polymer having a trans-1,4 content of 70~90%, a vinyl content of 2~10% and a Mooney viscosity (ML$_{1+4}$, 100° C.) of 30~100, at least 20% by weight of which being bonded with a tin compound of monofunctionality or difunctionality in a non-branched form, 30~80 parts by weight of at least one rubber selected from natural rubber, high cis-1,4 polyisoprene rubber and styrene-butadiene copolymer rubber having a glass transition temperature of not higher than −50° C., and 0~30 parts by weight of high cis-1,4 polybutadiene and/or low cis-1,4 polybutadiene, and containing 35~100 parts by weight of carbon black, 0~50 parts by weight of process oil, 0.5~5 parts by weight of aliphatic carboxylic acid and 0.1~3 parts by weight of sulfur based on 100 parts by weight of total amount of the above rubber components.

3. A rubber composition for tire comprising 20~70 parts by weight of a butadiene polymer having a trans-1,4 content of 70~90%, a vinyl content of 2~10% and a Mooney viscosity (ML$_{1+4}$, 100° C.) of 30~100 and containing 10~70% by weight of a structure bonded with a tin compound of trifunctionality or tetrafunctionality in a branched form and 90~30% by weight of a non-branched structure, 30~80 parts by weight of at least one rubber selected from natural rubber, high cis-1,4 polyisoprene rubber and styrene-butadiene copolymer rubber having a glass transition temperature of not higher than −50° C., and 0~30 parts by weight of high cis-1,4 polybutadiene and/or low cis-1,4 polybutadiene, and containing 35~100 parts by weight of carbon black, 0~50 parts by weight of process oil, 0.5~5 parts by weight of aliphatic carboxylic acid and 0.1~3 parts by weight of sulfur based on 100 parts by weight of total amount of the above rubber components.

4. The rubber composition according to any one of claims 1 to 3, wherein said butadiene polymer is produced in the presence of a catalyst consisting of:
 (a) an organomagnesium compound, an organic alkali metal compound or both an organomagnesium compound and an organic alkali metal compound,
 (b) an organic alkaline earth metal compound other than an organomagnesium compound, and
 (c) an organoaluminum compound.

5. The rubber composition according to claim 1, wherein said a-component is selected form 2,4-tolyllene diisocyanate, 2,6-tolyllene diisocyanate, diphenylmethane diisocyanate, polymetallic type diphenylmethane diisocyanate (C-MDI), phenyl isocyanate, isophorone diisocyanate, hexamethylene diisocyanate, butyl isocyanate, 1,3,5-benzene triisocyanate, phenyl isothiocyanate and phenyl-1,4-dithioisocyanate.

6. The rubber composition according to claim 1, wherein said b-component is selected from methyl carbamate, methyl-N,N-diethylcarbamate, isocyanuric acid, N,N',N'-trimethyl isocyanuric acid and thiocarbonyl containing compounds thereof.

7. The rubber composition according to claim 1, wherein said c-component is selected from N,N'-dimethyl urea, N,N'-diethyl urea, N,N,N',N'-tetramethyl urea and N,N-dimethyl-N',N'-diphenyl urea.

8. The rubber composition according to claim 1, wherein said d-component is selected from N,N-dimethyl formamide, acetoamide, N,N-diethyl acetoamide, aminoacetoamide, N,N-dimethyl-N',N'-dimethylamino acetoamide, N,N-dimethylamino acetoamide, N,N-ethylamino acetoamide, N,N-dimethyl-N',N'-ethylamino acetoamide, acrylamide, N,N-dimethyl acrylamide, N,N-dimethyl methacrylamide, nicotine amide, isonicotine amide, picoline acid amide, N,N-dimethyl isonicotine amide, succinic acid amide, phthalic acid amide, N,N,N',N'-tetramethyl phthalic acid amide, oxamide, N,N,N',N'-tetramethyl oxamide, 2-furane carboxylic acid amide, N,N-dimethyl-2-furane carboxylic acid amide, quinoline2-carboxylic acid amide, N-ethyl-N-methyl-quinoline carboxylic acid amide succinic acid imide, N-methyl succinic acid imide, maleimide, N-methyl maleimide, phthalimide and N-methyl phthalimide.

9. The rubber composition according to claim 1, wherein said e-component is selected from 1,3-diethyl-2-imidazolidinone, 1,3-dimethyl-2-imidazolidinone, 1,1-dipropyl-2-imidazolidinone, 1-methyl-3-ethyl-2-imidazolidinone, 1-methyl-3-propyl-2-imidazolidinone, 1-methyl-3-(2-methoxyethyl)-2-imidazolidinone, 1-methyl-2-ethoxyethyl)-2-imidazolidinone and 1,3-di-(2-ethoxyethyl)-2-imidazolidinone.

10. The rubber composition according to claim 1, wherein said f-component is selected from methyl 2-pyridylketone, methyl-4-pyridylketone, propyl-2-pyridylketone, di-4-pyridylketone, propyl-3-pyridylketone, 2-benzoyl pyridine, 2-vinyl pyridine and 4-vinyl pyridine.

11. The rubber composition according to claim 1, wherein said g-component is selected from N-methyl-2-pyrolidone, 2-piperidone, N-methyl-2-piperidone, 2-quinolone and N-methyl-quinolone.

12. The rubber composition according to claim 1, wherein said h-component is selected from dimethyl adipate, diethyl adipate, di-n-butyl adipate, dimethyl maleate, diethyl maleate, di-n-butyl maleate, di-n-octyl maleate and a mixture thereof.

13. The rubber composition according to claim 1, wherein said i-component is selected from alkyl xanthogenic acids, aryl xanthogenic acids, lithium, sodium and potassium salts of these xanthogenic acids, and xanthogen disulfides.

14. The rubber composition according to claim 1, wherein said j-component is selected from dithioformic acid and dithioacetic acid.

15. The rubber composition according to claim 1, wherein said k-component is selected form bis(dimethylamino) phosphoryl chloride, bis(diethylamino) phoshoryl chloride, bis(dipropylamino)phosphoryl chloride and bis(diisopropyl) phosphoryl chloride.

16. The rubber composition according to claim 1, wherein said l-component is selected from tetrachloro silane, tetrabromo silane, methyltrichloro silane, phenyltrichloro silane, hexyltribromo silane, dimethyldichloro silane, diethyldichloro silane, diphenyldibromo silane, phenylethylchloro silane, diethylchloro silane, trimethylchloro silane, tetraquis(2-ethylhexyloxy) silane, tetraphenoxy silane, methyltris(2-ethylhexyloxy) silane, ethyltris(2-ethylhexyloxy) silane, ethyltriphenoxy silane, vinyltris (2-ethylhexyloxy) silane, vinyltriphenoxy silane, methylvinylbis(2-ethylhexyloxy) silane, ethylvinyldiphenoxy silane, tri-t-butoxymonochloro silane, triphenoxymonochloro silane, monochloromethyldiphenoxy silane, monochloromethylbis(2-ethylhexyloxy) silane, monobromoethyldiphenoxy silane, monobromovinyldiphenoxy silane, monobromoisopropenylbis(2-ethylhexyloxy) silane, dichloro-di-t-butoxy silane, ditolyldichloro silane, di-t-butoxydiiodo silane, diphenoxydiiodo silane, methyltris(2-methylbutoxy) silane, vinyltris(2-methylbutoxy) silane, monochloromethylbis(2-methylbutoxy) silane, vinyltris(3-methylbutoxy) silane, 3-dimethylaminomethyl trimethoxy silane, 3-dimethylaminoethyl trimethoxy silane, 3-dimethylaminopropyl trimethoxy silane, 3-dimethylaminobutyl trimethoxy silane, 3-dimethylaminomethyl dimethoxymethyl silane, 3-dimethylaminoethyl dimethoxymethyl silane, 3-dimethylaminopropyl dimethoxymethyl silane, 3-dimethylaminobutyl dimethoxymethyl silane, 3-dimethylaminomethyl triethoxy silane, 3-dimethylaminoethyl triethoxy silane, 3-dimethylaminopropyl triethoxy silane, 3-dimethylaminobutyl triethoxy silane, 3-dimethylaminomethyl diethoxymethyl silane, 3-dimethylaminoethyl diethoxymethyl silane, 3-dimethylaminopropyl diethoxymethyl silane and 3-dimethylaminobutyl diethoxymethyl silane.

17. The rubber composition according to claim 1, wherein said m-component is selected from diethyl carbonate, phenylethyl carbonate, diphenyl carbonate and ethylene carbonate.

18. The rubber composition according to claim 2, wherein said tin compound of monofunctionality or difunctionality is selected from triphenyl tin chloride, diphenyl tin dichloride, tri-o-tolyl tin chloride, trimtolyl tin chloride, triphenyl tin bromide, tribenzyl tin chloride, dibenzyl tin dichloride, benzylphenyl tin dichloride, tributyl tin chloride, dibutyl tin dichloride, trimethyl tin chloride, dimethyl tin dichloride, tributyl tin bromide ,triphenyl tin phenoxide, triphenyl tin stearate, triphenyl tin laurate, triphenyl tin octoate, triphenyl tin oleate, diphenyl tin laurate, diphenyl tin distearate, diphenyl tin dioctoate, diphenyl tin dioleate, tributyl tin stearate, tributyl tin laurate, tributyl tin octoate, dibutyl tin distearate, dibutyl tin dilaurate, dibutyl tin dioctoate, dioctyl tin distaerate, dioctyl tin dilaurate and a mixture thereof.

19. The rubber composition according to claim 3, wherein said tin compound of trifunctionality or more is selected from methyltrichloro tin, butyltrichloro tin, phenyltrichloro tin, tetrachloro tin, tetrabromo tin, triphenyl tin chloride, tetraethoxy tin, diphenyl dichloride, divinyldichloro tin, tetravinyl tin, tetraallyl tin, bis(methyldichlorostanyl) ethane, bis(trichlorostanyl) ethane, tetraphenyl tin, tetratolyl tin, bis(trichlorostanyl) ethane and a mixture thereof.

* * * * *